(12) United States Patent
Frankman et al.

(10) Patent No.: US 11,607,634 B2
(45) Date of Patent: Mar. 21, 2023

(54) METHOD FOR CONCENTRATING SOLIDS AND REMOVING SOLIDS FROM A FILTER MEDIUM

(71) Applicant: Sustainable Energy Solutions, Inc., Provo, UT (US)

(72) Inventors: David Frankman, Provo, UT (US); Eric Mansfield, Spanish Fork, UT (US); Seth Babcock, Murray, UT (US)

(73) Assignee: Sustainable Energy Solutions, Inc., Provo, UT (US)

( * ) Notice: Subject to any disclaimer, the term of this patent is extended or adjusted under 35 U.S.C. 154(b) by 1330 days.

(21) Appl. No.: 15/990,439

(22) Filed: May 25, 2018

(65) Prior Publication Data

US 2019/0358568 A1 Nov. 28, 2019

(51) Int. Cl.
*B01D 35/24* (2006.01)
*B01D 35/16* (2006.01)
*B01D 35/20* (2006.01)
*B01D 41/04* (2006.01)

(52) U.S. Cl.
CPC ............ *B01D 35/24* (2013.01); *B01D 35/16* (2013.01); *B01D 35/20* (2013.01); *B01D 41/04* (2013.01); *B01D 2201/085* (2013.01); *B01D 2201/184* (2013.01); *B01D 2239/0407* (2013.01); *B01D 2239/1216* (2013.01)

(58) Field of Classification Search
None
See application file for complete search history.

(56) References Cited

U.S. PATENT DOCUMENTS

| | | | | |
|---|---|---|---|---|
| 3,360,907 A | * | 1/1968 | Clark, Jr. | B01D 46/4272 55/293 |
| 4,316,368 A | * | 2/1982 | Van Pelt | B01D 9/0013 62/542 |
| 4,794,226 A | * | 12/1988 | Derbyshire | H05B 6/108 210/695 |
| 10,293,297 B2 | * | 5/2019 | Baxter | B01D 53/002 |
| 10,329,182 B2 | * | 6/2019 | Baxter | B01D 29/23 |
| 10,408,534 B2 | * | 9/2019 | Kaminsky | B01D 7/02 |
| 10,449,478 B2 | * | 10/2019 | Baxter | B01D 53/002 |

(Continued)

FOREIGN PATENT DOCUMENTS

| | | | | |
|---|---|---|---|---|
| WO | WO-9731693 A1 | * | 1/1997 | C11D 1/62 |
| WO | WO-0045948 A1 | * | 8/2000 | B01J 8/006 |

OTHER PUBLICATIONS

U.S. Department of Energy DE-FE0028697, "Cryogenic Carbon Capture Development—Final/Technical Report," authored by Baxter et al., submitted by Sustainable Energy Solutions, LLC, Sep. 28, 2019, 113 pages. (Year: 2019).*

*Primary Examiner* — Chester T Barry
(74) *Attorney, Agent, or Firm* — Cook Alex Ltd.

(57) ABSTRACT

Disclosed are methods for concentrating solids and removing solids from a filter medium. The method includes the step of concentrating first particles of a first solid by removing a fluid stream through a filter medium in a filter. At least some of the first particles become blocking particles that block pores of the filter medium. The method also includes the step of inserting second particles of a second solid into the filter. These second particles scrape, vibrate, agglomerate, or a combination thereof along the filter medium, thus dislodging at least a portion of the blocking particles.

16 Claims, 7 Drawing Sheets

(56) References Cited

U.S. PATENT DOCUMENTS

| | | | |
|---|---|---|---|
| 2003/0045591 A1* | 3/2003 | O'Rear | C10G 2/33 |
| | | | 518/706 |
| 2011/0073549 A1* | 3/2011 | Geibel | B01D 24/24 |
| | | | 210/291 |
| 2016/0280573 A1* | 9/2016 | Livingston | B01F 33/409 |
| 2018/0170783 A1* | 6/2018 | Baxter | C02F 11/125 |
| 2018/0170784 A1* | 6/2018 | Baxter | B01D 29/46 |
| 2018/0172346 A1* | 6/2018 | Baxter | F25J 3/08 |
| 2018/0283780 A1* | 10/2018 | Baxter | F25J 3/08 |
| 2018/0283781 A1* | 10/2018 | Baxter | B01D 53/002 |
| 2018/0283782 A1* | 10/2018 | Baxter | B01D 17/0202 |
| 2019/0010070 A1* | 1/2019 | Hodgkinson | B01D 61/22 |
| 2019/0358568 A1* | 11/2019 | Frankman | B01D 35/24 |

* cited by examiner

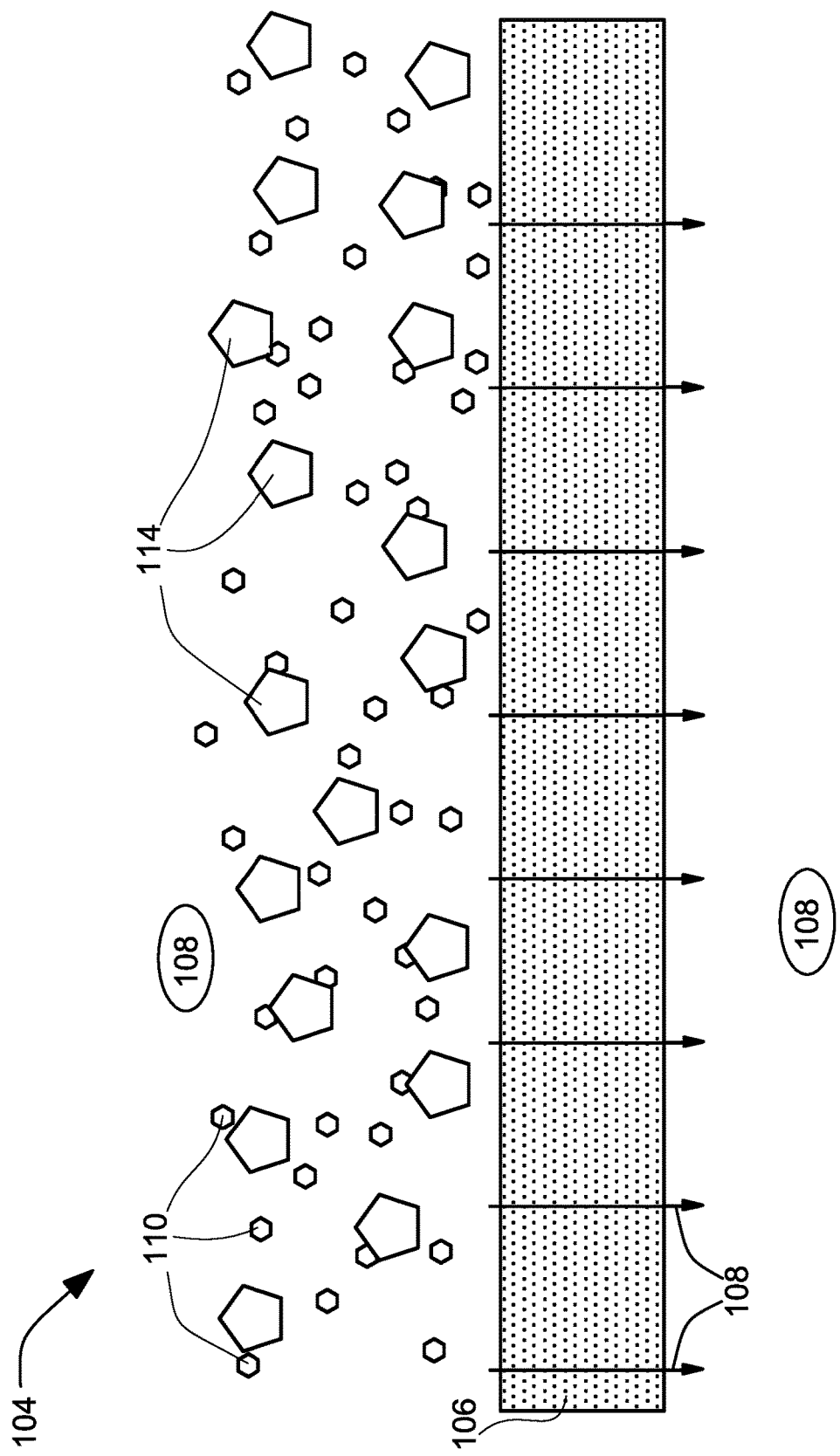

METHOD FOR CONCENTRATING SOLIDS AND REMOVING SOLIDS FROM A FILTER MEDIUM

GOVERNMENT INTEREST STATEMENT

This invention was made with government support under DE-FE0028697 awarded by the Department of Energy. The government has certain rights in the invention.

FIELD OF THE INVENTION

The methods and processes described herein relate generally to filtering of solids from liquids. More particularly, the methods and processes described herein relate to methods for filtering that includes clearing blockage from a filter medium of a cross-flow filter.

BACKGROUND

Separations of solids out of fluids is a fundamental process used in many industries. Blockages in the filter medium caused by solids build-up or solids embedding in the medium is a widespread problem. This is usually solved by shutting down the equipment and either replacing the filter medium or reversing the flow through the filter. Devices, systems, and methods for removing blockages without shutting down the filter unit would be beneficial.

SUMMARY

Methods for removing solids from a filter medium are disclosed.

In a first aspect, the invention is a method for concentrating solids and removing solids from a filter medium. The method includes the step of concentrating first particles of a first solid by removing a fluid stream through a filter medium in a filter. At least some of the first particles become blocking particles that block pores of the filter medium. The method also includes the step of inserting second particles of a second solid into the filter. These second particles scrape, vibrate, agglomerate, or a combination thereof along the filter medium, thus dislodging at least a portion of the blocking particles.

The method may also include the second solids being passed out a separate exit from the first solids. The second solids may be recycled back into a filter.

The method may also include the second solids being made of the same material as the first solids. The second solids may be processed with the first solids. Some variations may also include recycling part of first and second solids exit stream to make second solids used in the filter. In other variations, the first and second particles pass through a sizing apparatus where they are separated, and the second solids are recycled back into the filter. In yet other variations, both sets of solids are melted to form a liquid product. Some of this liquid product may be diverted and used to form the second solids.

The method may also include the first solids being entrained in a contact liquid. Further variations may include injecting a product liquid into the filter where it freezes to form the second solids. The contact fluid may comprise water, hydrocarbons, liquid ammonia, cryogenic liquids, or a combination thereof.

The method may also include an auger to move the solids along the filter; the auger may change the second solids such that they cause the filter to vibrate or scrape the filter medium, dislodging the first solids blockages.

The method may also include the second particles attaching to the first particles by sintering or agglomerating to the blockage and forcing the removal of the blockage. The removal may be through increased stress from fluid flow, greater friction against a moving part, or a combination thereof.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 1A-E are cutaway side views of a filter with small solids.

DETAILED DESCRIPTION

Figure 1A:
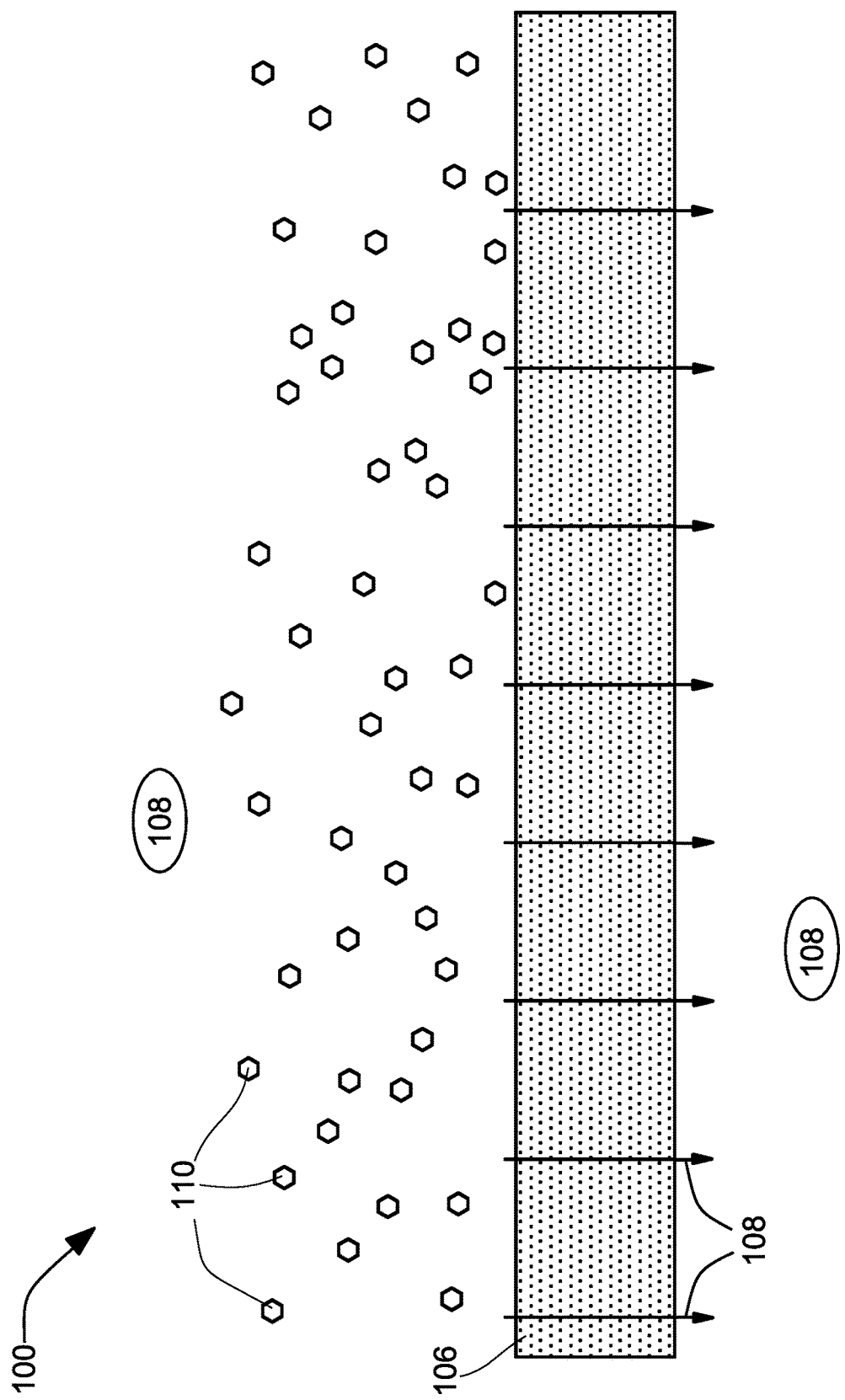
Figure 1B:
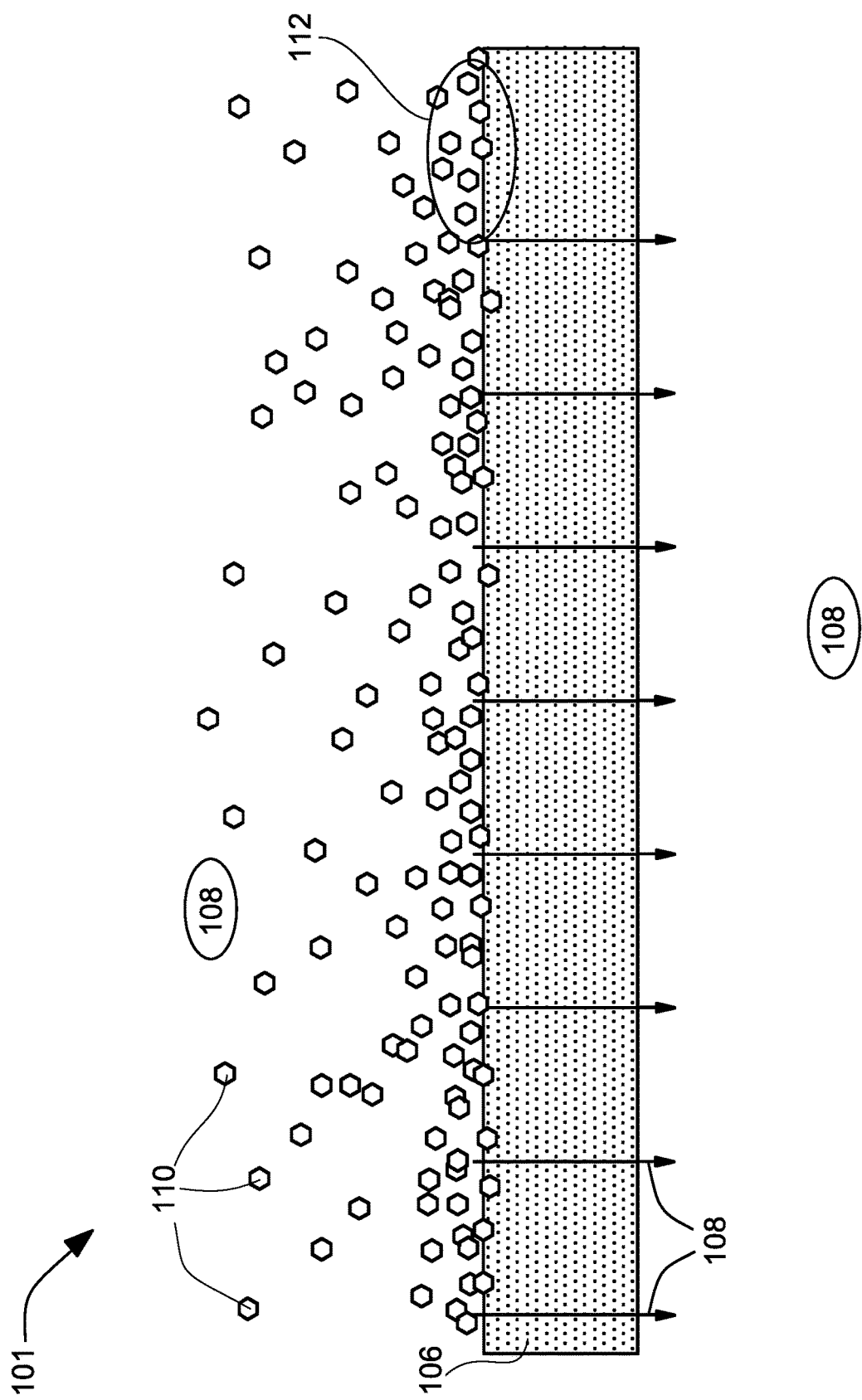
Figure 1C:
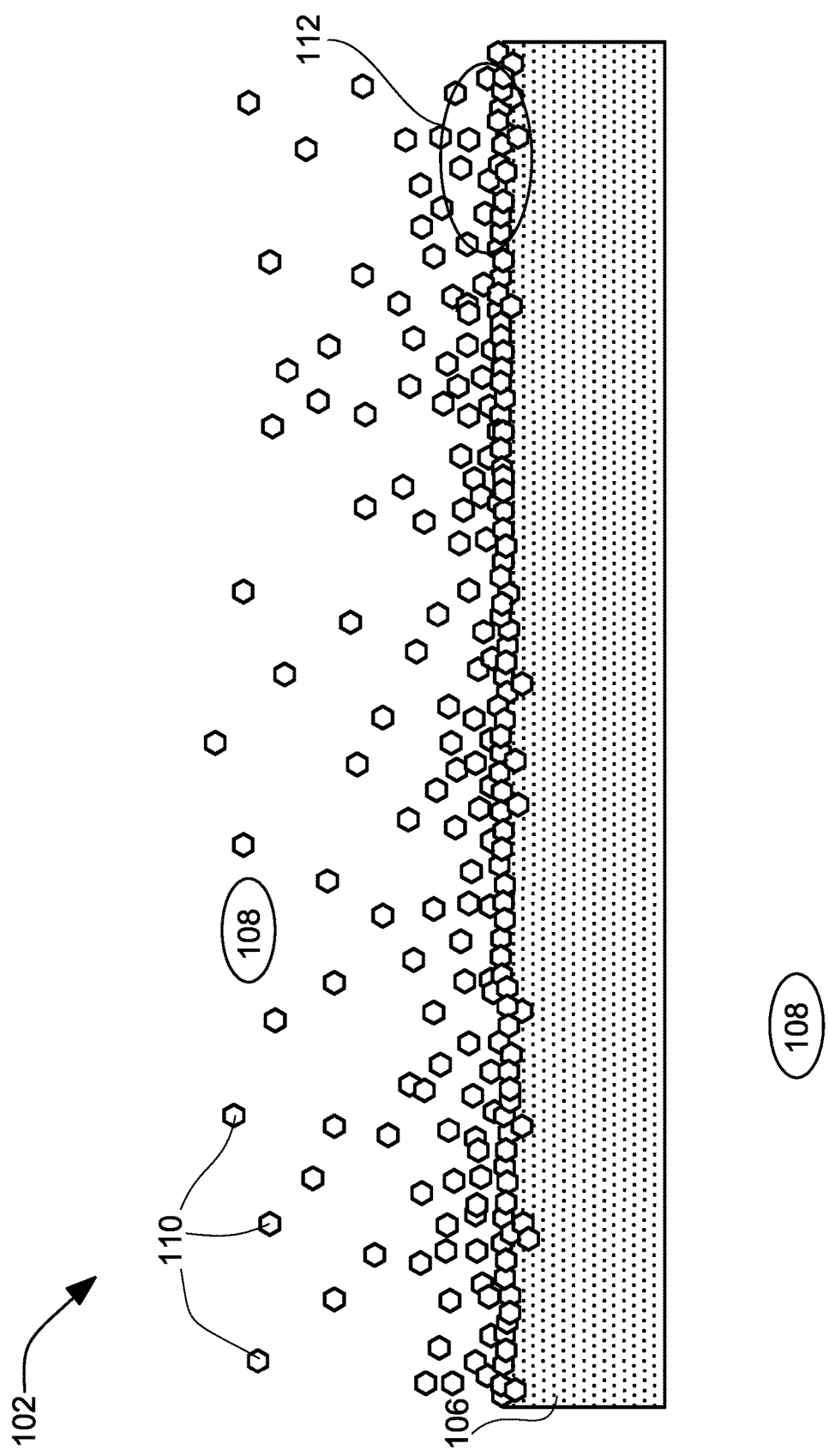
Figure 1D:
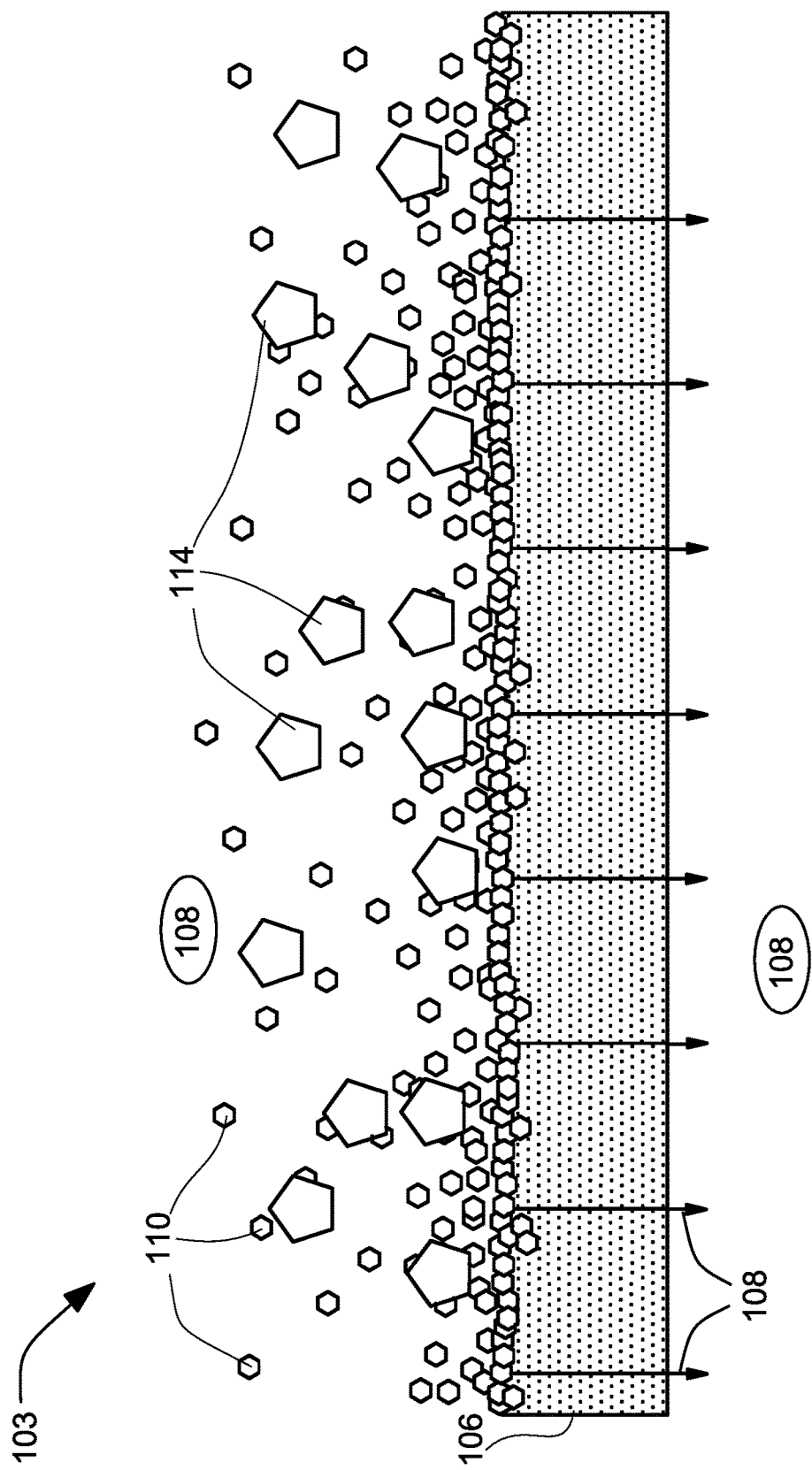

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "filter medium" refers to any porous material through which a first material of a process stream may pass while a second material of the process stream may not pass, at least not in any significant quantities.

When filtering solids from a fluid using cross-flow filtration, blockages are often formed by the solids building up on or embedding in the filter medium. The most common ways to solve this problem involve shutting down the filtration unit and either replacing the filter medium or running fluid backwards through the filter medium, clearing out the blockages. This results in material costs and lost time for maintenance. Removing the blockages from the filter medium without shutting the unit down is ideal. Removal of these solids without shutting the unit down would decrease operating costs and increase profits. Methods disclosed herein address this issue. Releasing oversized solids into the filter can clear the filter medium. These oversized solids will be larger than the solids being filtered. The second solids scrape away blockages or cause the filter medium to vibrate in such a way as to clear the blockages. This allows the filter medium to be cleared without shutting down the filtration unit, decreasing the time needed to maintain the filter unit.

Now referring to the Figures, FIGS. 1A-E are cutaway side views 100-104 of a filter medium 106 that may be used in the described methods. The filter medium 106 is porous such that the contact fluid 108 can pass through it, but first particles of a first solid 110 cannot, as shown at 100. As filtering continues, 101 shows the start of a clog or a blockage 112 by first solids 110 adhering to or embedding in the filter medium 106. The blockage 112 is only partially blocking the flow of contact fluid 108 through filter medium 106. As filtering continues, as shown in 102, blockage 112 builds further, eventually blocking the flow of contact fluid 108 through filter medium 106. In some embodiments, the resultant increase in pressure on the solids size causes an increase of pressure, triggering the release of second particles of a second solid 114, as shown at 103. The second particles 114 scrape along or bounce off the filter medium, knocking off the blockage 112 or causing vibrations that knock off the blockage 112. As shown at 104, the second particles 114 clear the filter medium 106, allowing cross-flow filtration to continue.

In some embodiments, the second solids are made of the same material as the first solids. In other embodiments, the second solids are small spheres that are recovered and used again in case of another blockage.

Figure 2:
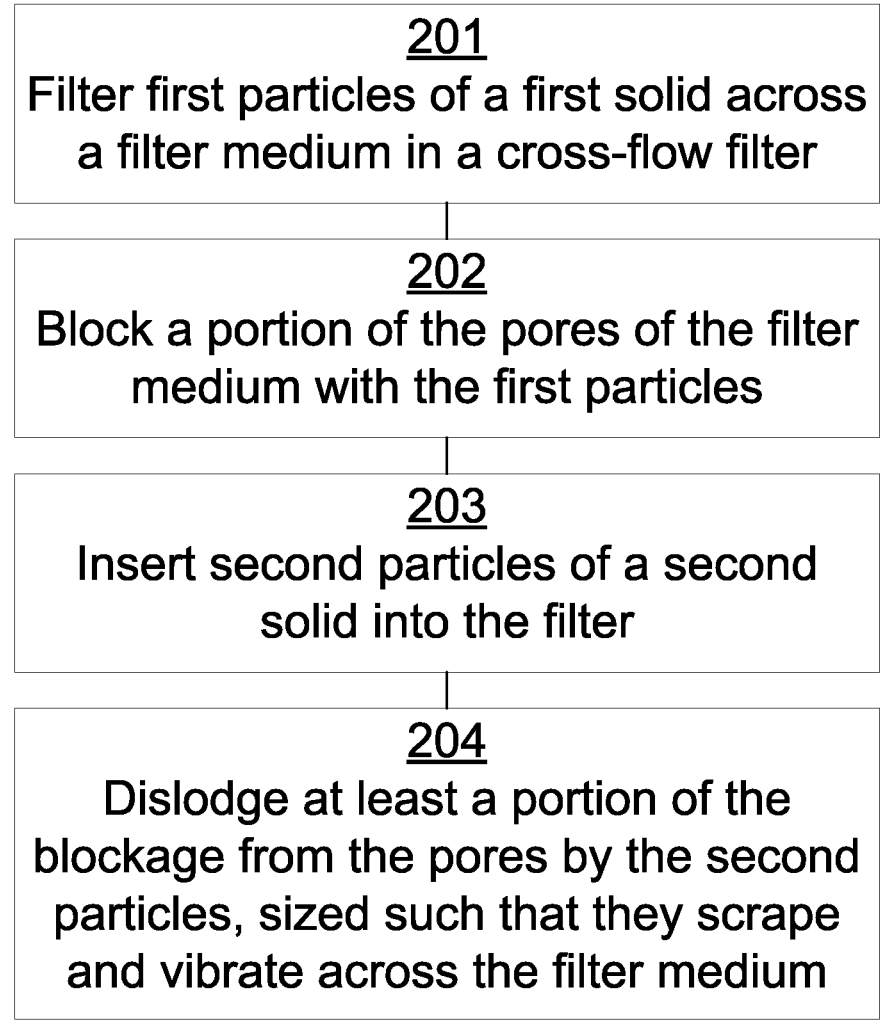
FIG. 2 is a method for removing solids from a filter medium.

Referring now to FIG. 2, FIG. 2 is a method for removing solids from a filter medium is disclosed that may be used in the described methods. At 201, first particles of a first solid across are filtered across a filter medium in a cross-flow filter. At 202, a portion of the first particles block pores of the filter medium as a blockage. At 203, second particles of a second solid are inserted into the filter. The second particles are larger than the first particles. At 204, the second particles are sized such that the second particles scrape and vibrate across the filter medium, dislodging at least a portion of the blockage from the pores.

Figure 3:
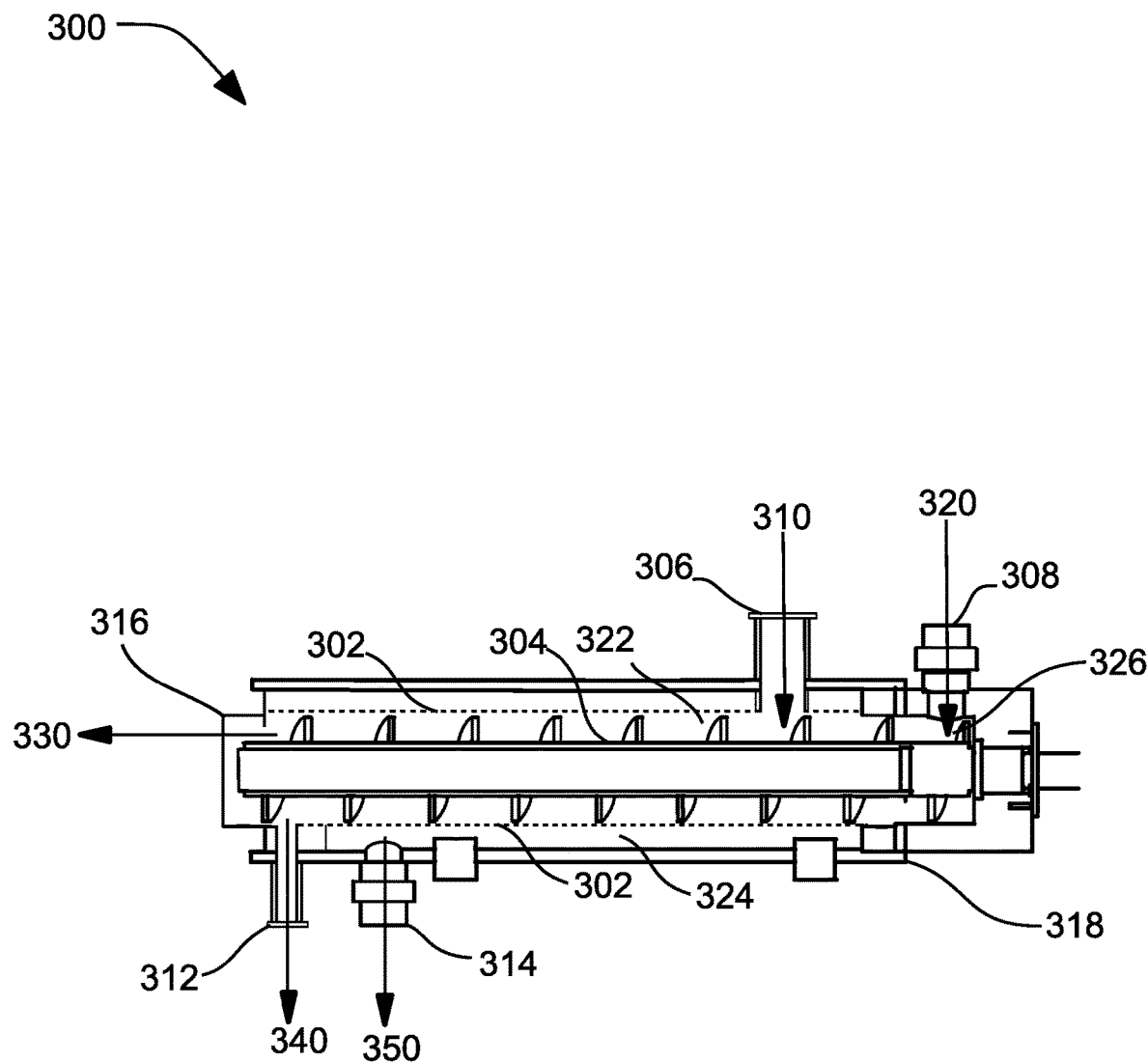
FIG. 3 is a cross-sectional side view of a screw filter device.

Referring now to FIG. 3, FIG. 3 is a cross-sectional side view of a screw filter device 318 with auger 304. The terms "screw" and "auger" are used synonymously herein. First solid and fluid mixed stream 310 enters through inlet 306 into chamber 322. Fluid 350 passes through filter medium 302, into fluids plenum 324, and out fluid exit port 314. This increases the first solid concentration in stream 330. Concentrated first solid stream 340 falls out through first solid exit 316. As more first solids are filtered out, the first solids will at least partially block the pores of filter medium 302. A second solid is introduced by injecting liquid 320, preferably made of the same compound as the first solid, into chamber 326, where it freezes into the second solid 340. Auger 304 pushes the second solids 340 along the filter medium 302, forcing the first solids that are blocking the pores of filter medium 302 to dislodge through scraping. In other embodiments, the second solids cause vibrations that cause the first particles to dislodge. In yet other embodiments, the second solids are shaped, chemically formulated, or otherwise designed to agglomerate so that the auger can scrape the agglomerated solids off the filter medium. Second solids 330 exit out second solid exit 316 as they can't fit through solids exit 312. These are melted and recycled back as liquid 320.

In some embodiments, the second solids may be passed out a separate exit from the first solids. The second solids may be recycled back into the filter.

In some embodiments, the second solids may be made of the same material as the first solids. The second solids may be processed with the first solids. Some embodiments may also include recycling part of the first and second solids exit streams to make the second solids used in the filter. In other embodiments, the first and second particles pass through a sizing apparatus where they are separated, and a portion of the second solids are recycled back into the filter. In yet other embodiments, both sets of solids are melted to form a liquid product. Some of this liquid product may be diverted and used to form the second solids.

In some embodiments, the first solids are entrained in a contact liquid. Further embodiments may include injecting a product liquid into the filter where it freezes to form the second solids. The contact fluid may be water, hydrocarbons, liquid ammonia, cryogenic liquids, or a combination thereof. The contact liquid may comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or a combination thereof.

In some embodiments, the contact liquid may be a mixture of a solvent and an ionic compound, the solvent comprising water, hydrocarbons, liquid ammonia, liquid carbon dioxide, cryogenic liquids, or a combination thereof, and the ionic compound comprising potassium carbonate, potassium formate, potassium acetate, calcium magnesium acetate, magnesium chloride, sodium chloride, lithium chloride, calcium chloride, or a combination thereof. In some embodiments, the contact liquid may be a mixture of a solvent and a soluble organic compound, the solvent comprising water, hydrocarbons, liquid ammonia, liquid carbon dioxide, cryogenic liquids, or a combination thereof, and the soluble organic compound comprising glycerol, ammonia, propylene glycol, ethylene glycol, ethanol, methanol, or a combination thereof.

In some embodiments, the filter may use an auger to move the solids along the filter; the auger may change the second solids such that they cause the filter to vibrate or scrape the filter medium, dislodging the first solids blockages.

In some embodiments, the second particles may attach to the first particles by sintering or agglomerating to the blockage and force the removal of the blockage. The removal may be through increased stress from fluid flow, greater friction against a moving part, or a combination thereof.

The invention has been described with reference to various specific and preferred embodiments and techniques. Nevertheless, it is understood that many variations and modifications may be made while remaining within the spirit and scope of the invention.

The invention claimed is:

1. A method for concentrating solids and removing solids from a filter medium comprising:
   concentrating first particles of a first solid by removing a fluid stream through the filter medium in a filter, wherein at least some of the first particles become blocking particles that block pores of the filter medium;
   inserting second particles of a second solid into the filter, wherein the second particles scrape, vibrate, agglomerate, or a combination thereof along the filter medium;
   dislodging at least a portion of the blocking particles with the second particles; and
   providing a first exit for the first particles and a second exit for the second particles.

2. The method of claim 1, further comprising passing the first particles out of the first exit and the second particles out of the second exit.

3. The method of claim 2, further comprising recycling the second particles into the filter.

4. The method of claim 1, further comprising separating the second particles from the first particles and recycling the second particles to the filter.

5. A method for concentrating solids and removing solids from a filter medium comprising:
   concentrating: first particles of a first solid by removing a fluid stream through the filter medium in a filter, wherein at least some of the first particles become blocking particles that block pores of the filter medium;
   inserting second particles of a second solid into the filter, wherein the first solid and the second solid are the same compound or mixture of compounds and the second particles scrape, vibrate, agglomerate, or a combination thereof along the filter medium;
   dislodging at least a portion of the blocking particles with the second particles;
   passing the first particles and the second particles out of the filter and through a sizing apparatus: and
   melting the first particles and second particles to form a product liquid.

6. The method of claim 5, further comprising freezing a portion of the product liquid to form the second particles.

7. A method for concentrating solids and removing solids from a filter medium comprising:
   concentrating first particles of a first solid by removing a fluid stream through the filter medium in a filter, wherein at least some of the first particles become blocking particles that block pores of the filter medium;
   inserting second particles of a second solid into the filter, wherein the first solid and the second solid are different compounds and the second particles scrape, vibrate agglomerate, or a combination thereof along the filter medium;
   dislodging at least a portion of the blocking particles with the second particles.

8. A method for concentrating solids and removing solids from a filter medium comprising:
   concentrating first particles of a first solid by removing a fluid stream through the filter medium in a filter, wherein at least some of the first particles become blocking particles that block pores of the filter medium;
   inserting second particles of a second solid into the filter, wherein the second particles scrape, vibrate, agglomerate, or a combination thereof along the filter medium;
   dislodging at least a portion of the blocking particles with the second particles;
   wherein the first solid comprises water, hydrocarbons, ammonia, carbon dioxide, nitrogen oxide, sulfur dioxide, nitrogen dioxide, sulfur trioxide, hydrogen sulfide, or a combination thereof.

9. A method for concentrating solids and removing solids from a filter medium comprising:
   concentrating first particles of a first solid by removing a fluid stream through the filter medium in a filter, wherein at least some of the first particles become blocking particles that block pores of the filter medium;
   inserting second particles of a second solid into the filter, wherein the second particles scrape, vibrate, agglomerate, or a combination thereof along the filter medium;
   dislodging at least a portion of the blocking particles with the second particles;
   wherein the fluid stream comprises a contact liquid, wherein the contact liquid is water, hydrocarbons, liquid ammonia, cryogenic liquids, or a combination thereof; and
   wherein the contact liquid comprises a mixture of a solvent and an ionic compound, the solvent comprising water, hydrocarbons, liquid ammonia, liquid carbon dioxide, cryogenic liquids, or a combination thereof, and the ionic compound comprising potassium carbonate, potassium formate, potassium acetate, calcium magnesium acetate, magnesium chloride, sodium chloride, lithium chloride, calcium chloride, or a combination thereof.

10. The method of claim 9, wherein the contact liquid comprises 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or a combination thereof.

11. A method for concentrating solids and removing solids from a filter medium comprising:
   concentrating first particles of a first solid by removing a fluid stream through the filter medium in a filter, wherein at least some of the first particles become blocking particles that block pores of the filter medium;

inserting second particles of a second solid into the filter, wherein the second particles scrape, vibrate, agglomerate, or a combination thereof along the filter medium;

dislodging at least a portion of the blocking particles with the second particles;

wherein the fluid stream comprises a contact liquid, wherein the contact liquid is water, hydrocarbons, liquid ammonia, cryogenic liquids, or a combination thereof; and wherein the contact liquid comprises a mixture of a solvent and a soluble organic compound, the solvent comprising water, hydrocarbons, liquid ammonia, liquid carbon dioxide, cryogenic liquids, or a combination thereof, and the soluble organic compound comprising glycerol, ammonia, propylene glycol, ethylene glycol, ethanol, methanol, or a combination thereof.

12. A method for concentrating solids and removing solids from a filter medium comprising:

concentrating first particles of a first solid by removing a fluid stream through the filter medium in a filter, wherein at least some of the first particles become blocking particles that block pores of the filter medium;

inserting second particles of a second solid into the filter, wherein the second particles scrape, vibrate, agglomerate, or a combination thereof along the filter medium;

dislodging at least a portion of the blocking particles with the second particles;

wherein the fluid stream comprises a contact liquid, wherein the contact liquid is water, hydrocarbons, liquid ammonia, cryogenic liquids, or a combination thereof; and further comprising forming the second particles by injecting a liquid into the contact liquid wherein the liquid freezes.

13. The method of claim 1, wherein the filter comprises a cross-flow filter.

14. A method for concentrating solids and removing solids from a filter medium comprising:

concentrating first particles of a first solid by removing a fluid stream through the filter medium in a filter, wherein at least some of the first particles become blocking particles that block pores of the filter medium;

inserting second particles of a second solid into the filter, wherein the second particles scrape, vibrate, agglomerate, or a combination thereof along the filter medium;

dislodging, at least a portion of the blocking particles with the second particles;

wherein the fluid stream comprises a contact liquid, wherein the contact liquid is water, hydrocarbons, liquid ammonia, cryogenic liquids, or a combination thereof; and further comprising conveying the contact liquid and first particles along the filter medium by a mechanical device.

15. The method of claim 14, wherein the mechanical device comprises an auger, a plunger, a cylindrical ring, a scraper, or a combination thereof.

16. The method of claim 1, wherein the fluid comprises a liquid, a supercritical fluid, or a combination thereof.

* * * * *